(12) United States Patent
Suzuki

(10) Patent No.: US 6,661,481 B2
(45) Date of Patent: Dec. 9, 2003

(54) LIQUID CRYSTAL DISPLAY AND FABRICATING METHOD THEREOF

(75) Inventor: Shunji Suzuki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 09/795,815

(22) Filed: Feb. 28, 2001

(65) Prior Publication Data

US 2001/0028420 A1 Oct. 11, 2001

(30) Foreign Application Priority Data

Feb. 28, 2000 (JP) .................................... 2000-052415

(51) Int. Cl.⁷ .............................................. G02F 1/133
(52) U.S. Cl. ........................................ 349/73; 349/110
(58) Field of Search .................................... 349/73, 110

(56) References Cited

U.S. PATENT DOCUMENTS 5,812,226 A * 9/1998 Izumi et al. ................... 349/73

FOREIGN PATENT DOCUMENTS

| JP | 01195420 A | * | 8/1989 | .......... G02F/1/133 |
| JP | PUPA 01-217491 | | 8/1989 | |
| JP | 01251013 A | * | 10/1989 | .......... G02F/1/133 |
| JP | 2-59999 | | 12/1990 | |
| JP | 2-60000 | | 12/1990 | |
| JP | 05088163 A | * | 4/1993 | ......... G02F/1/1335 |
| JP | 05088189 A | * | 4/1993 | ......... G02F/1/1339 |
| JP | PUPA 08-122769 | | 5/1996 | |
| JP | 8-122769 | | 5/1996 | |
| JP | PUPA 11-024047 | | 1/1999 | |
| JP | PUPA 11-064879 | | 3/1999 | |

* cited by examiner

*Primary Examiner*—Kenneth Parker
(74) *Attorney, Agent, or Firm*—Derek S. Jennings

(57) ABSTRACT

A display panel complex includes a plurality of image display panels arranged on the same plane and a joint for joining adjacent image display panels to each other among the plurality of image display panels. The joint is made of opaque particles having an opaqueness and an adhesive resin for dispersing and holding the opaque particles.

13 Claims, 11 Drawing Sheets

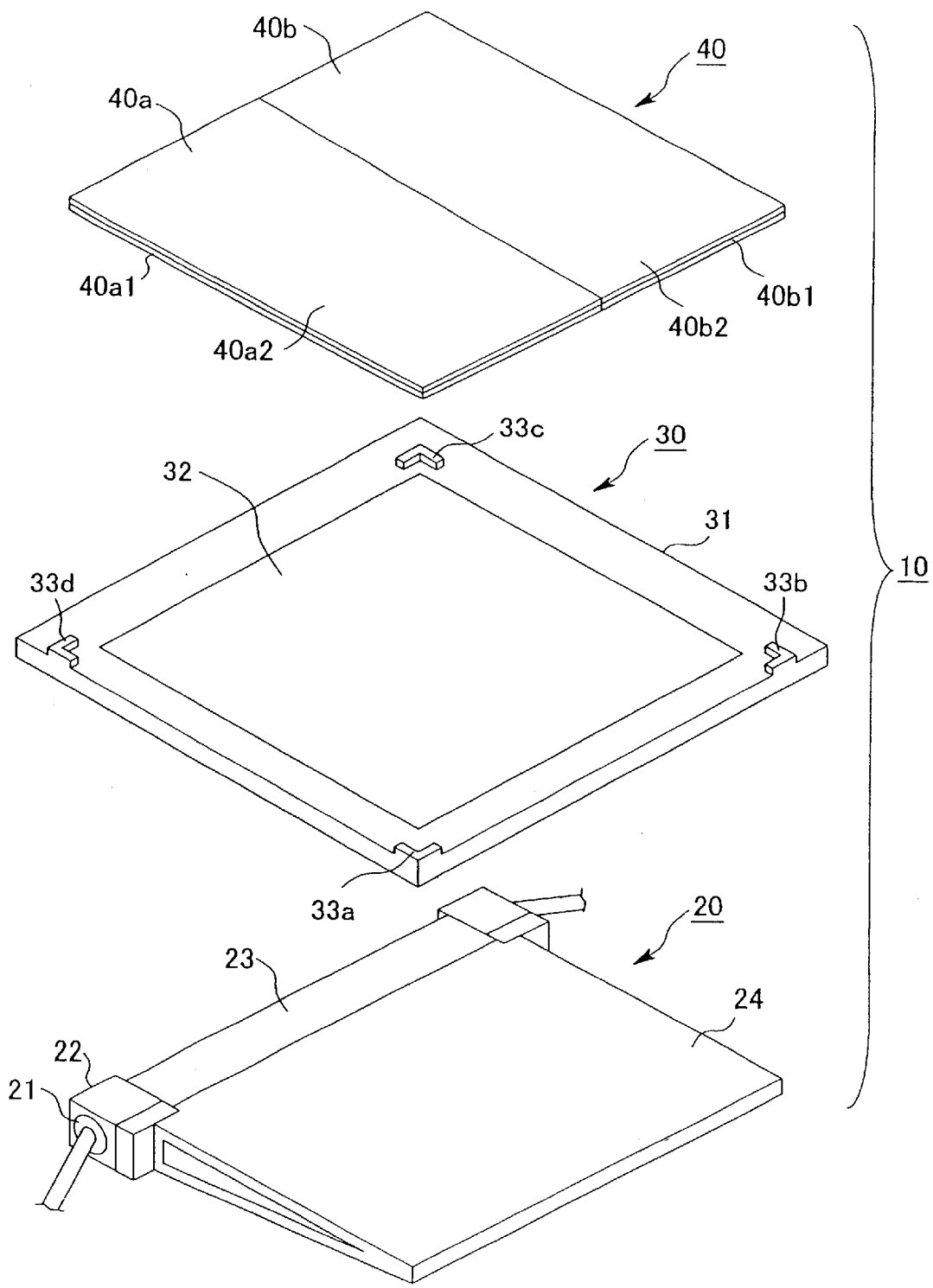
[Figure 1]

[Figure 2]
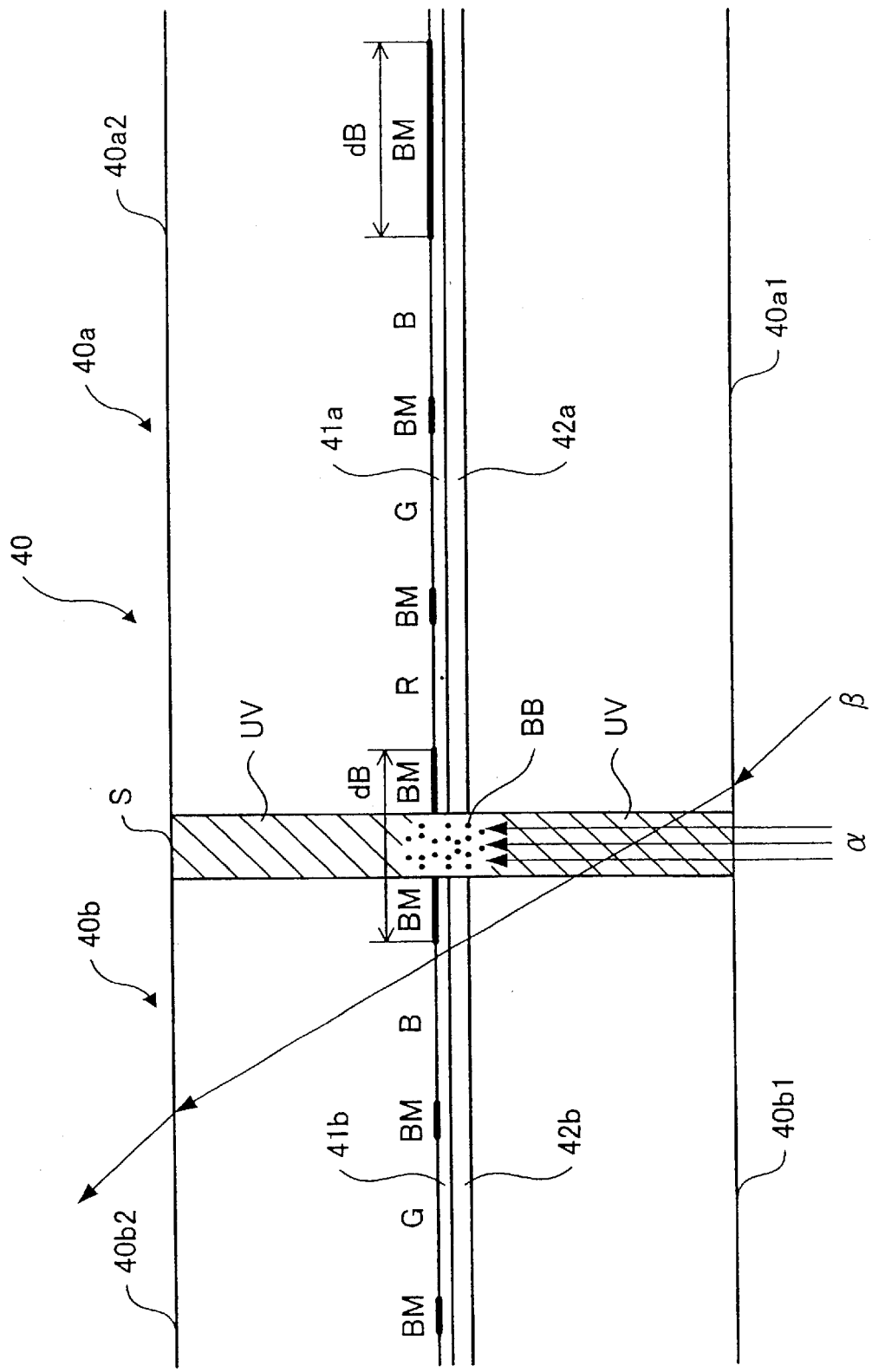

[Figure 3]
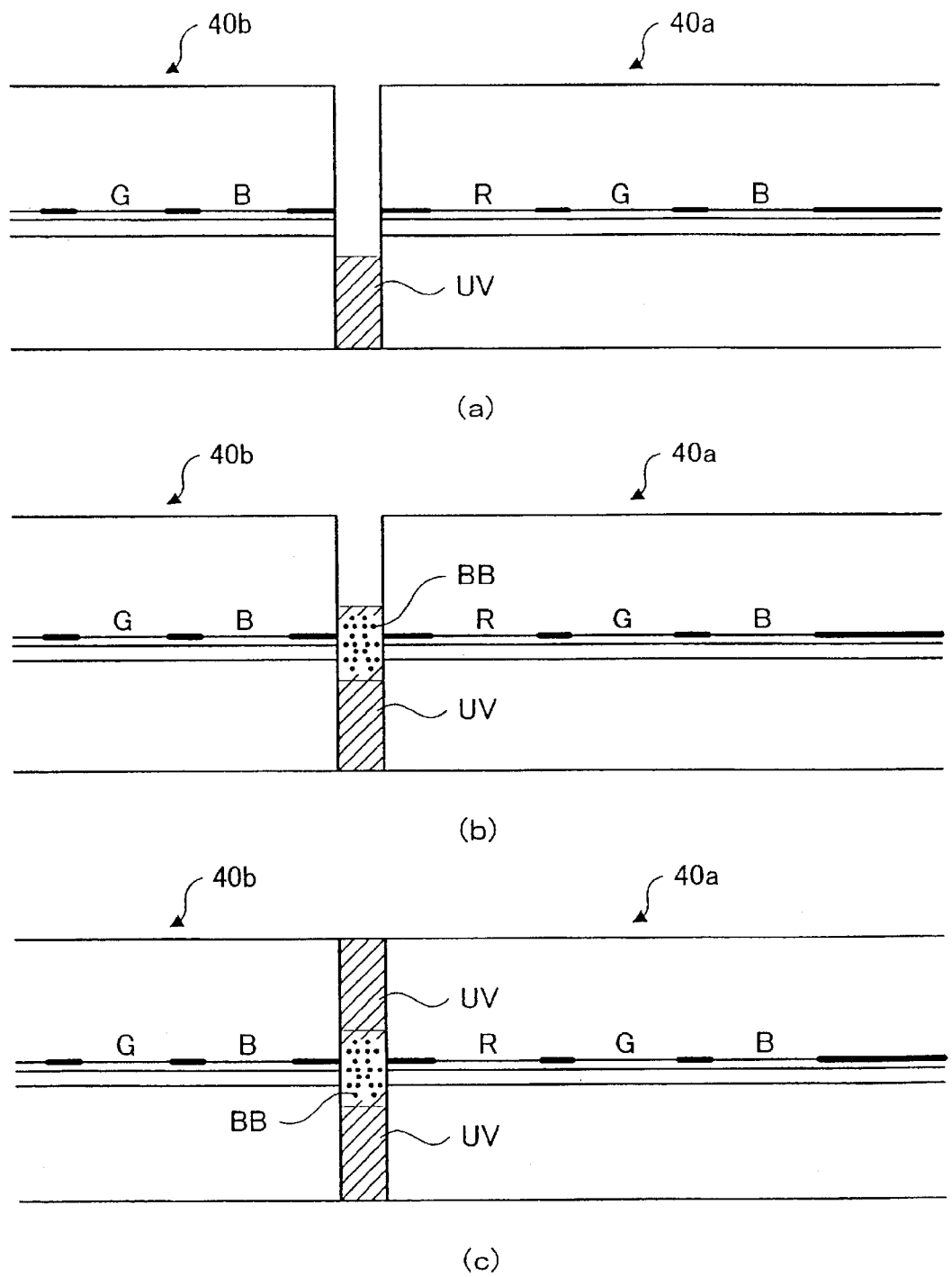

[Figure 4]
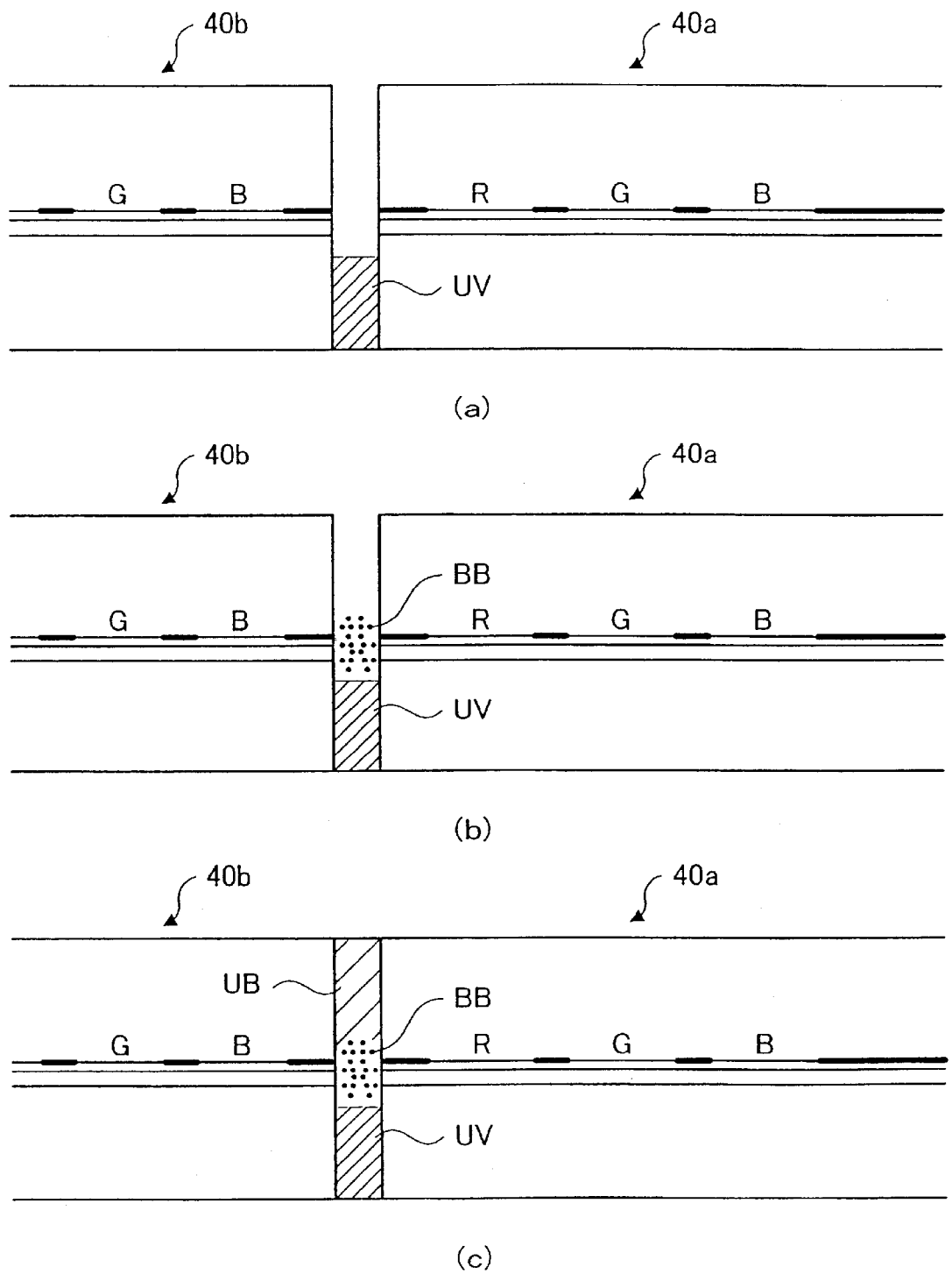

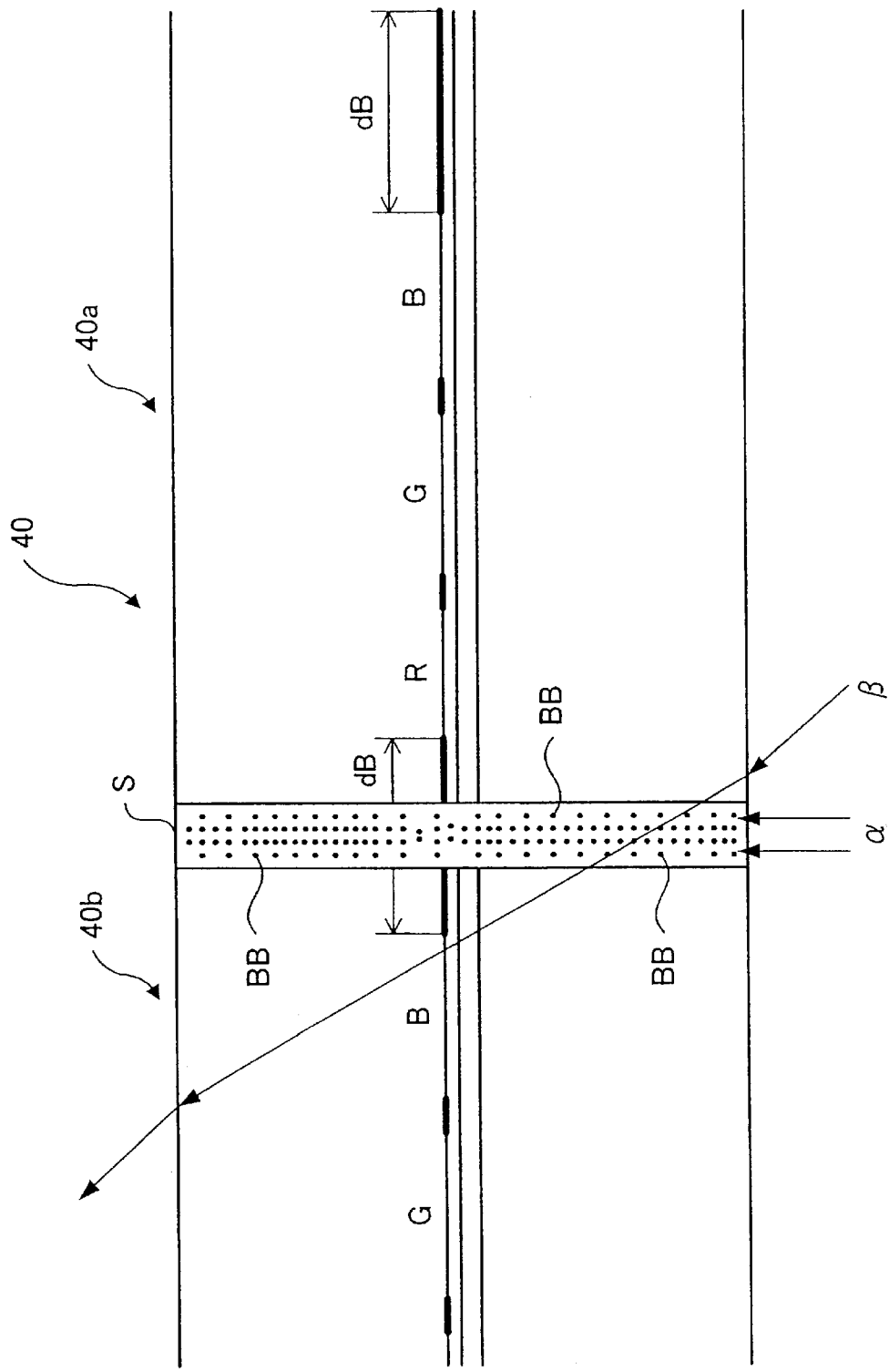
[Figure 5]

[Figure 6]
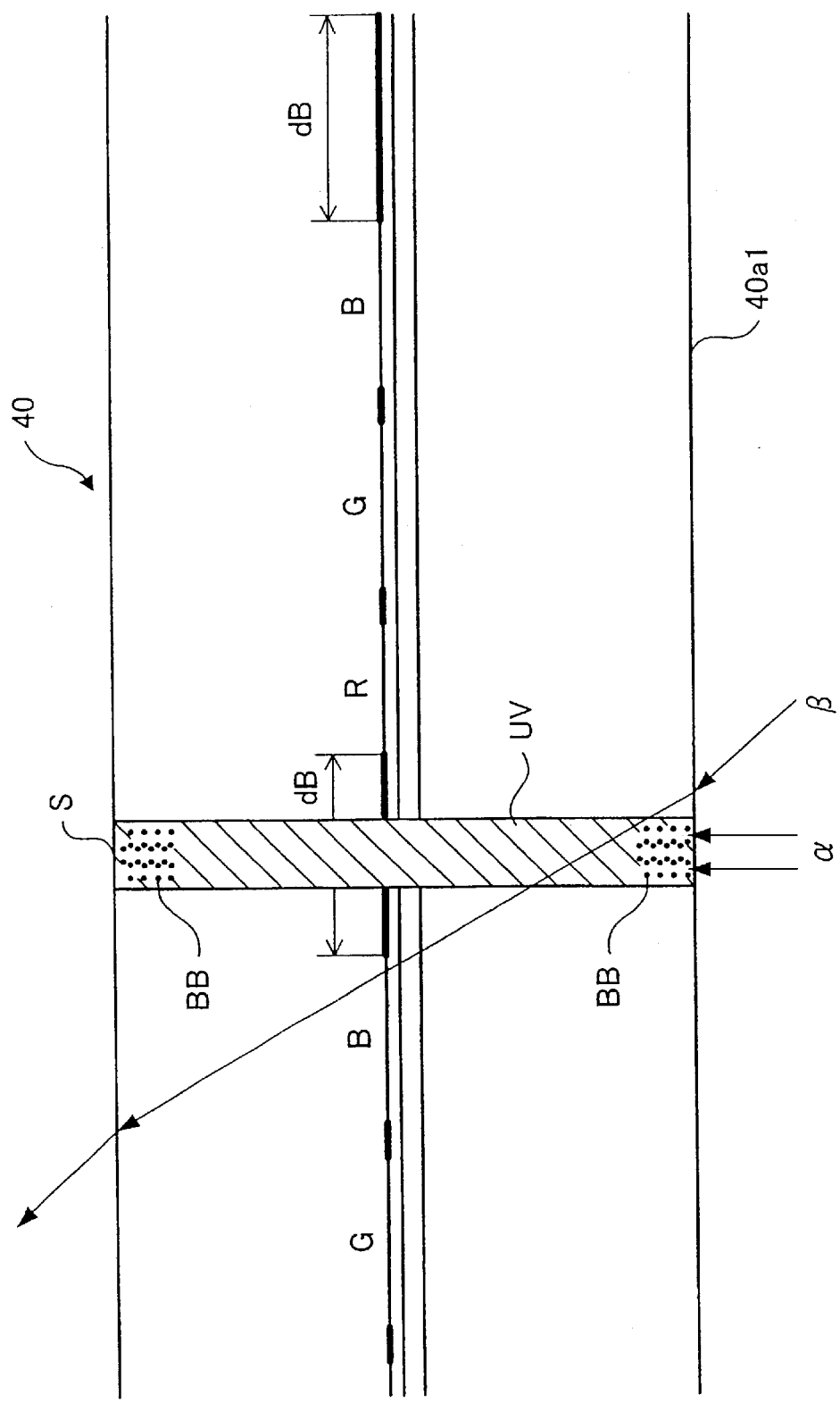

[Figure 7]
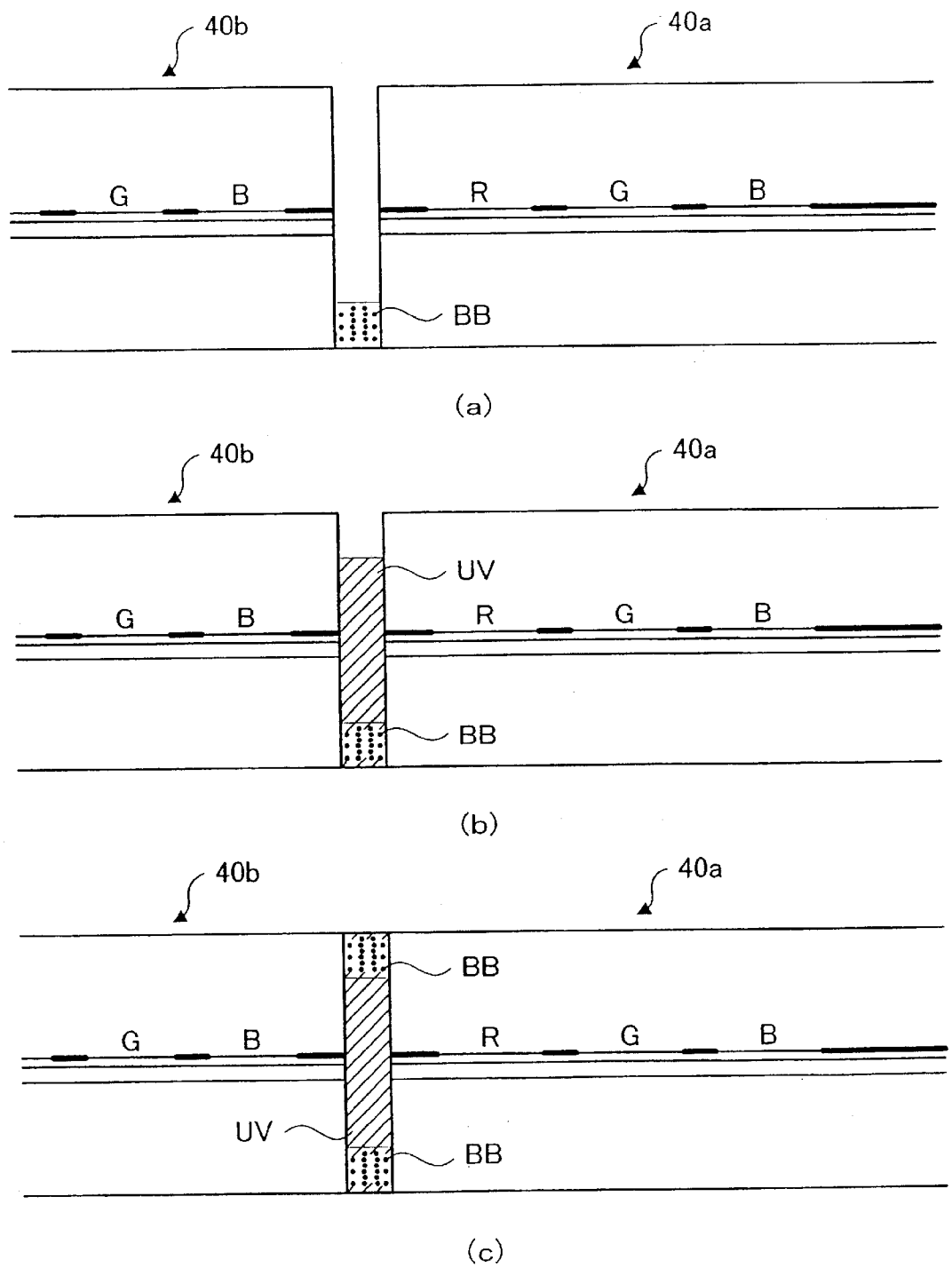

[Figure 8]
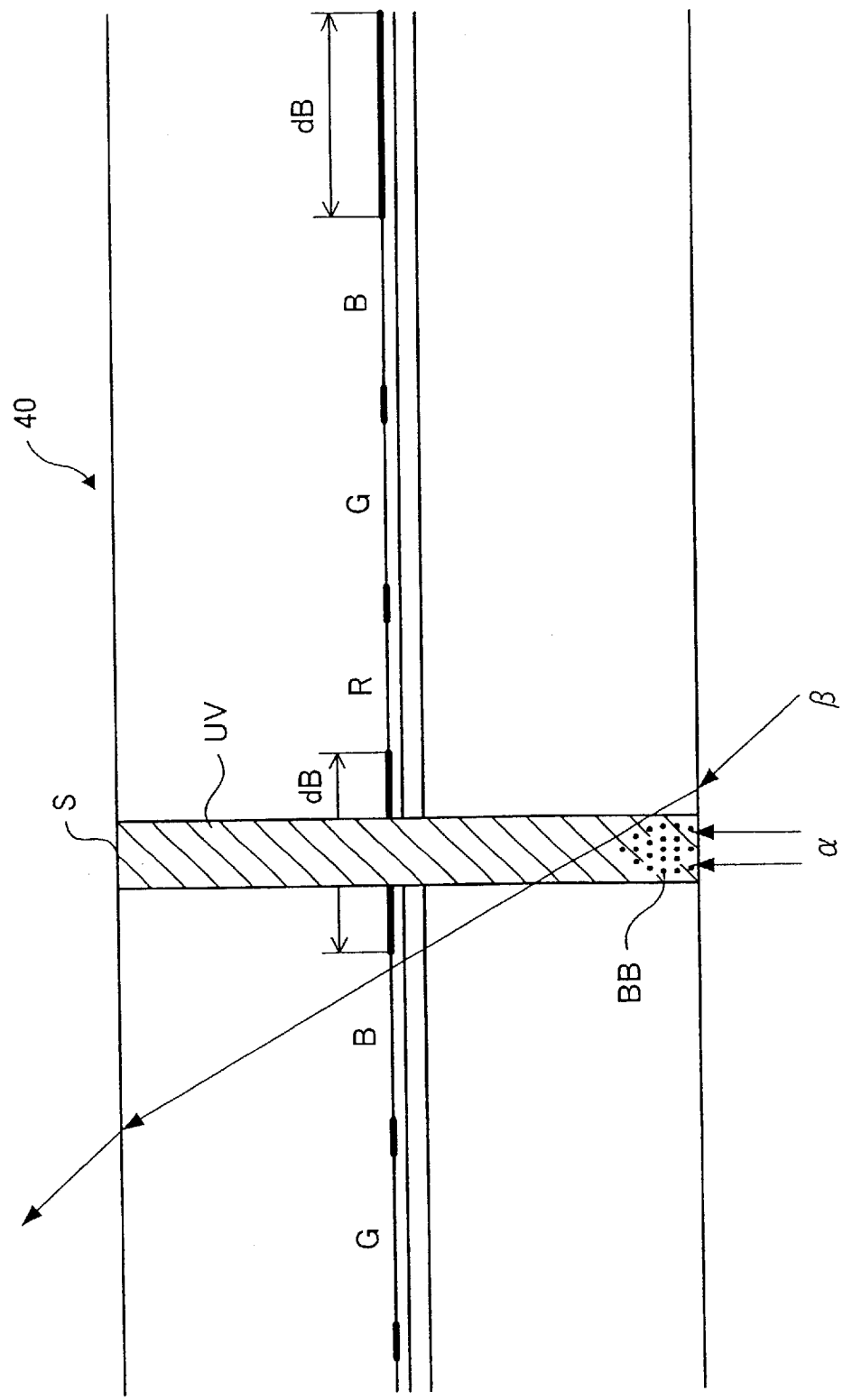

[Figure 9]
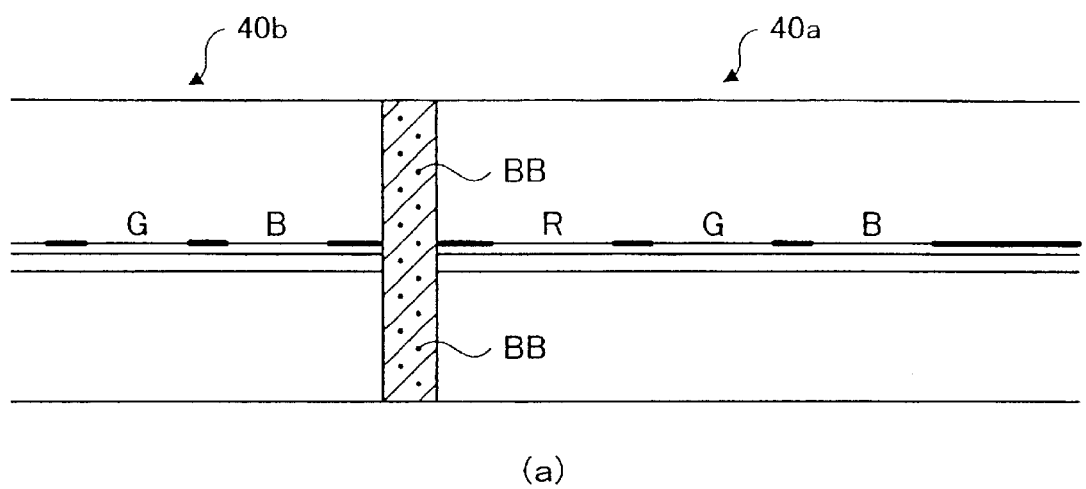
(a)
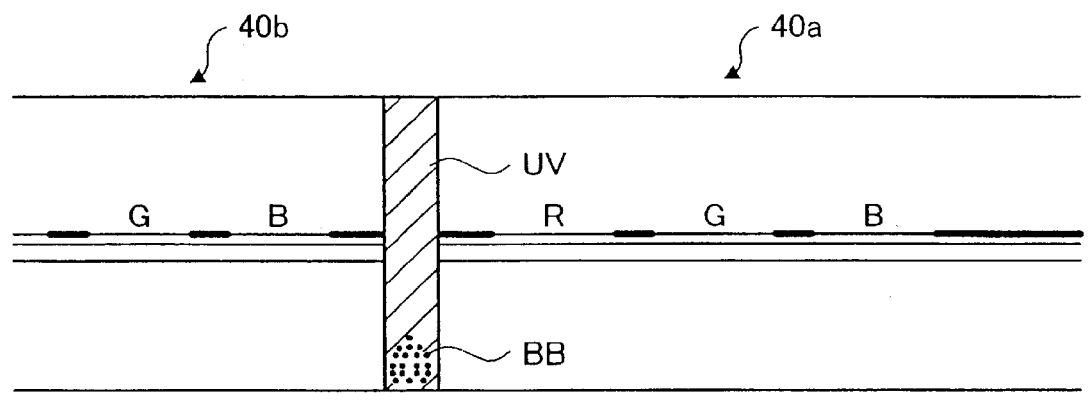
(b)

[Figure 10]
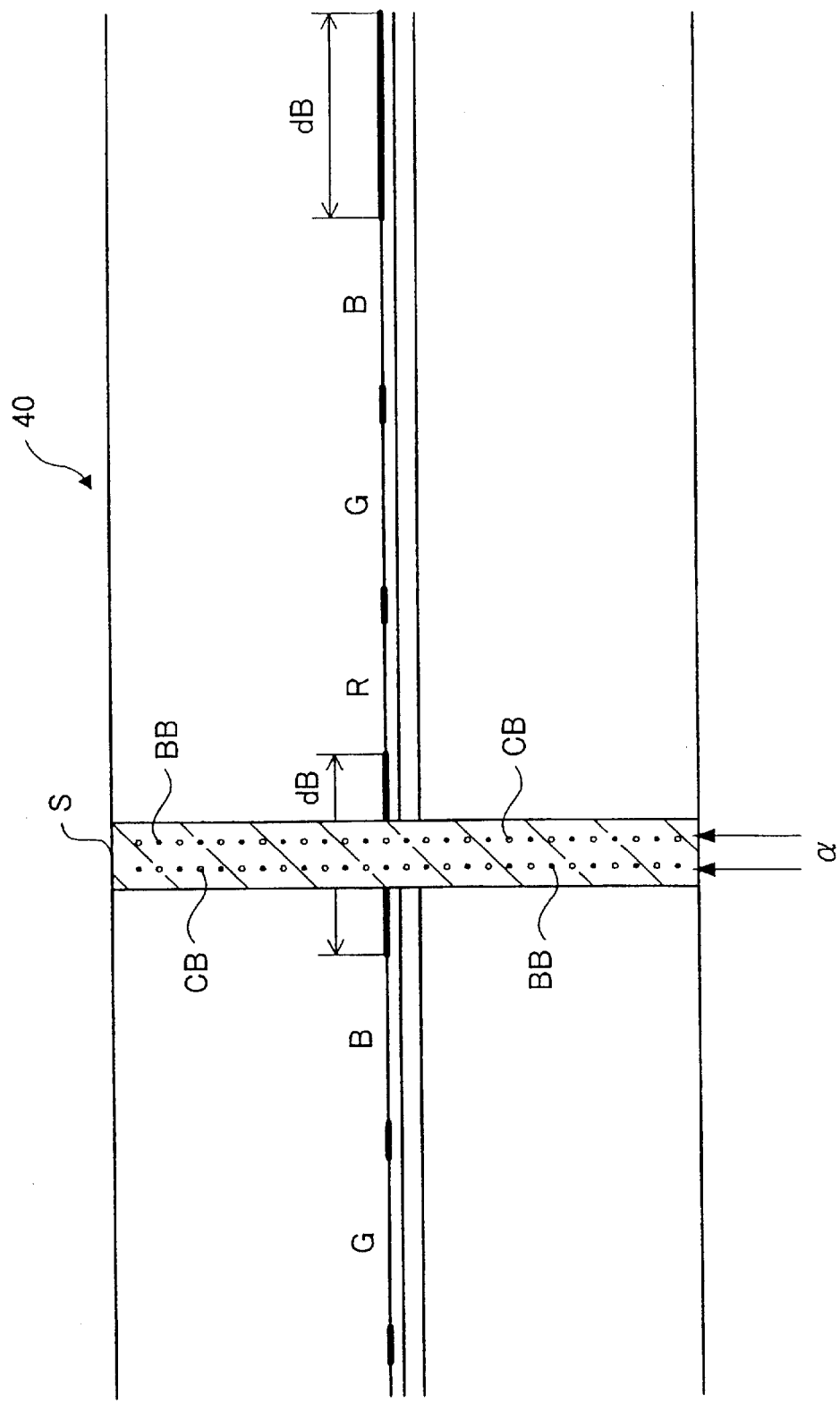

[Figure 11]
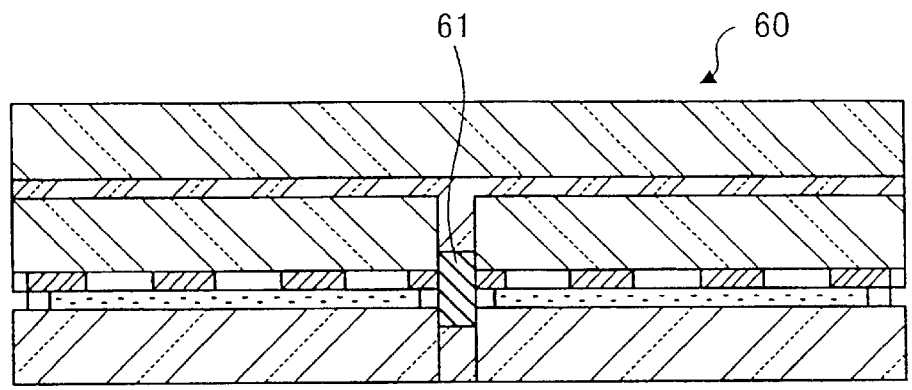
[Figure 12]
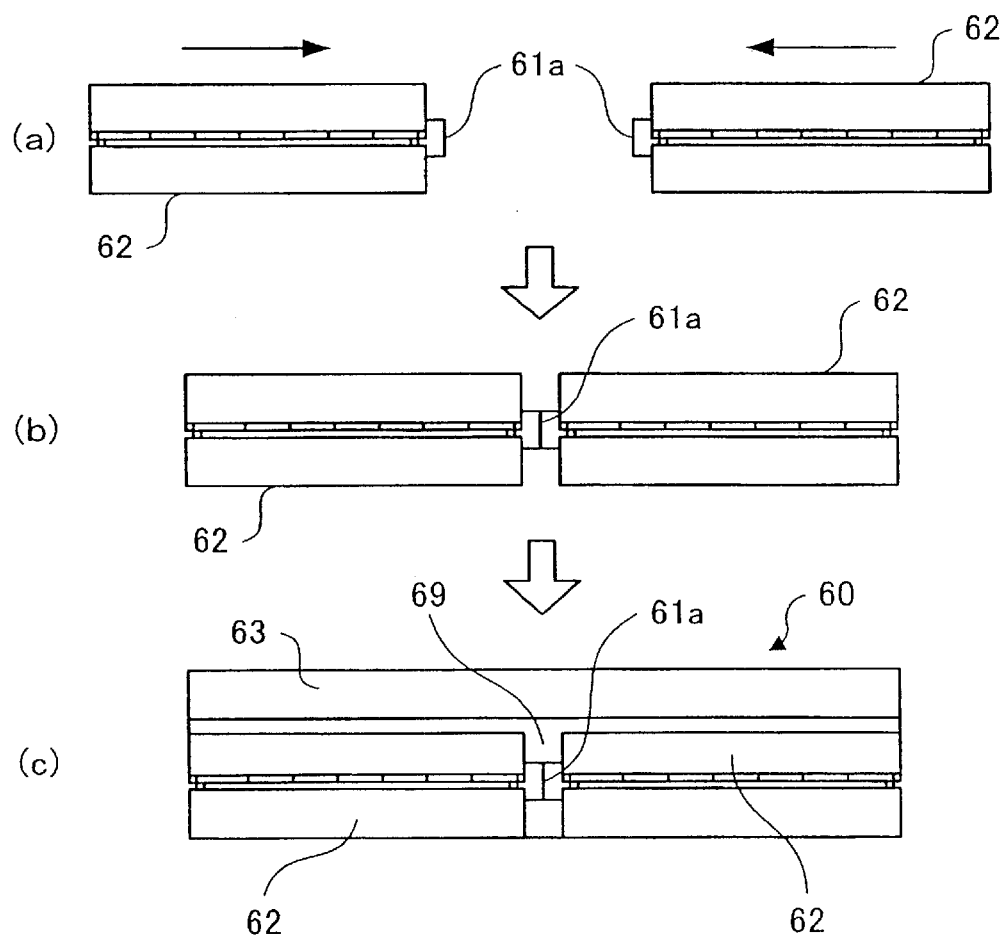

LIQUID CRYSTAL DISPLAY AND FABRICATING METHOD THEREOF

FIELD OF THE INVENTION

The present invention relates to a liquid crystal display, particularly to a liquid crystal display having one display screen by adjacently arranging a plurality of liquid crystal display panels on the same plane.

BACKGROUND OF THE INVENTION

High resolution displays, which in the past have progressed slowly in CRT displays, is about to rapidly progress in accordance with the introduction of new arts including liquid crystal. That is, it is comparatively easy to improve the resolution of a liquid crystal display compared to the case of a CRT display by micro-machining the liquid crystal display.

There has been additional study to further increase the screen size of the liquid crystal display. However, to increase the size a single liquid crystal display panel having a liquid crystal display, fraction defective is increased due to disconnection of signal wiring or pixel defect in the fabrication process.

Therefore, a large screen is achieved by adjacently arranging a plurality of liquid crystal display panels on the same plane and thereby, making a multi-type liquid crystal display as a whole. The panel constituted by adjacently arranging a plurality of liquid crystal display panels is referred to as a tile panel.

The problem with tile panels is that it is very difficult to have the joints of liquid crystal display panels in close contact with each other. This is due to fabrication errors of liquid crystal display panels, thereby, forming gaps. The light leaking from the gaps may deteriorate display performances. Therefore, to prevent the light from leaking, it is proposed to apply masking to the display plane side. It is possible to prevent parallel light vertical to a liquid crystal display panel out of the light emitted from a light source from leaking through masking. However, for the light incoming diagonally to a liquid crystal display panel, it is impossible to show the complete effect of the masking.

Therefore, it is proposed in Published Examined Japanese Patent Application No. 2-59999 to place an opaque material in a joint between liquid crystal display panels. More specifically, black paint is applied to the periphery of each liquid crystal display panel. Therefore, the light diagonally incoming to a liquid crystal display panel is interrupted by the black paint applied to the periphery of the liquid crystal display panel and therefore, it cannot enter the liquid crystal display panel.

Moreover, it is proposed in Published Examined Japanese Patent Application No. 2-60000 to apply an opaque material, specifically, black paint to a position corresponding to a joint between liquid crystal display panels on a common diffusion plate closely contacted to the surfaces of a plurality of liquid crystal display panels at the light source side.

However, the method for applying black paint to the periphery of a liquid crystal display panel disclosed in Published Examined Japanese Patent Application No. 2-59999 has the following problem. That is, the brightness of a liquid crystal display panel is reduced because not only diagonally incoming light but also the light to be incoming into a pixel are prevented from entering the liquid crystal display panel. The same is true for the liquid crystal display panel proposed in Published Examined Patent Application No. 2-60000.

Published Unexamined Japanese Patent Application No. 8-122769, FIG. 11 of the present patent application, shows a schematic sectional view of the liquid crystal display. Though the liquid crystal display is the same as those disclosed in Published Examined Japanese Patent Application Nos. 2-59999 and 2-60000 in that an opaque member is formed on a joint between liquid crystal panels 60. The opaque member 61, made of silicone-based rubber, is set to the central portion of the end face of the liquid crystal panel 60 at the joint side. Thus, by setting the opaque member 61 to the central portion of the end face of the liquid crystal panel 60 at the joint side, the incoming light into a pixel out of diagonally incoming light can enter the liquid crystal panel 60.

Published Unexamined Japanese Patent Application No. 8-122769 describes, as shown in FIG. 12(A) of the present application, an opaque member 61*a* is formed at a predetermined width in the longitudinal direction of the connection-side end face of each liquid crystal display panel 62 to be joined and nearby the central portion of the end face. Then, as shown in FIG. 12(B), the liquid crystal display panels 62 are connected so that the opaque members 61*a* are closely contacted to each other. Then, as shown in FIG. 12(C), while the liquid crystal display panels 62 are connected to each other through the opaque members 61*a*, a large substrate 63 is attached to the liquid crystal display panels 62 through a refractive-index adjusting member 69 made of an UV cure resin.

To form the opaque member 61*a* at a predetermined width in the longitudinal direction of the connection-side end face of the liquid crystal display panel 62 and nearby the central portion of the end face, it is described in Published Unexamined Japanese Patent Application No. 8-122769 that it is possible to use a method for covering a predetermined position of the connection-side end face of the liquid crystal display panel 62 with a mask tape and applying silicone-based rubber, a method for applying silicone-based rubber by using a dispenser, or a method for applying silicone-based rubber by means of screen printing or offset printing.

A glass substrate forming the liquid crystal display panel 62 has dimensions of approx. 300×400 mm to 400×500 mm and has a thickness of approx. 0.7 mm. The liquid crystal display panel 62 is constructed by superposing two glass substrates through a liquid crystal layer, and the thickness of the two glass substrates is equal to approx. 1.4 mm.

However, it is not easy to accurately form the opaque member 61*a* over a length of 300 to 500 mm in the range of a thickness of 1.4 mm. Moreover, because silicone-based rubber has flowability when it is applied, it is difficult to obtain a desired shape of the opaque member 61*a* because the rubber flows immediately after it is applied. Therefore, even if the opaque member 61*a* is formed on the connection-side end faces of two liquid crystal display panels 62, it is difficult to have the opaque members 61*a* in close contact with each other over a length of 300 to 400 mm when connecting two liquid crystal display panels 62. That is, it is not easy to industrially make them in close contact with each other over the length.

Therefore, it is an object of the present invention to efficiently fabricate a tile panel capable of preventing light from leaking from a joint or a liquid crystal display using the tile panel.

SUMMARY OF THE INVENTION

A feature of the present invention provides a display panel complex comprising a plurality of image display panels arranged on the same plane and a joint for joining adjacent image display panels to each other among the plurality of image display panels. The joint is made of opaque particles having an opaqueness and an adhesive resin for dispersing and holding the opaque particles.

Another feature of the present invention provides a liquid crystal display including a liquid crystal display panel section having a plurality of liquid crystal display panels provided with a first glass substrate on which a black matrix is formed and a second glass substrate on which a liquid crystal driving device is formed on the same plane while keeping very small gaps between the panels. A filled part made of an UV cure resin fills very small gaps between the adjacent liquid crystal display panels among the above plurality of liquid crystal display panels and in which black particles are dispersed.

Still another feature of the present invention provides a liquid crystal display comprising a plurality of liquid crystal display panels arranged on the same plane while keeping predetermined gaps between them and a joint for joining adjacent liquid crystal display panels among the above the plurality of liquid crystal display panels. The joint is provided with a transparent resin layer and opaque particles, having a certain opaqueness, are dispersed in the resin layer. Further included are transparent particles made from a resin, which are dispersed in the resin layer and pass light having a refractive index different from that of the resin layer.

Another feature of the present invention is a liquid crystal-display-panel joining method comprising the steps of arranging a plurality of liquid crystal display panels while keeping predetermined intervals between the display panels, injecting resin compositions containing opaque particles between the adjacent liquid crystal display panels, and curing the injected resin compositions containing the opaque particles.

Yet another feature of the present invention provides a liquid crystal-display fabricating method for making a display screen by arranging a plurality of liquid crystal display panels on the same plane while keeping very small gaps between them, comprising a step of arranging the liquid crystal display panels while keeping predetermined gaps between them; a step of injecting transparent resin compositions into the gaps between adjacent liquid crystal display panels and then injecting resin compositions containing opaque particles into the gaps, and moreover injecting transparent resin compositions into the gaps; and providing a resin-composition curing step of curing the resin compositions injected into the gaps between the adjacent liquid crystal display panels.

Furthermore, the present invention provides a liquid crystal-display fabricating method for making a display screen by arranging a plurality of liquid crystal display panels on the same plane while keeping very small gaps between them, comprising a step of arranging the liquid crystal display panels while keeping predetermined intervals between them, a first resin-composition injecting step of injecting transparent resin compositions into the gaps between the adjacent liquid crystal display panels; a step of scattering opaque particles onto the injected transparent resin compositions in the gaps between the adjacent liquid crystal display panels; a second resin-composition injecting step of injecting transparent resin compositions into the gaps between the adjacent liquid crystal display panels after scattering the opaque particles; and a resin-composition curing step of curing the resin compositions injected into the gaps between the adjacent liquid crystal display panels.

Furthermore, still yet another feature of the present invention provides a liquid crystal-display fabricating method comprising a step of arranging a plurality of liquid crystal display panels while keeping predetermined gaps between them, a step of injecting a mixture of transparent resin compositions and opaque particles having a specific gravity larger than that of the transparent resin compositions into the gaps between the adjacent liquid crystal display panels; and a curing step of curing the transparent resin compositions in the mixture.

According to yet another feature of the present invention provided is a liquid crystal-display fabricating method for configuring a display screen by arranging a plurality of liquid crystal display panels on the same plane while keeping very small gaps between the panels, comprising a step of injecting opaque particles having opaqueness, transparent particles passing light, and transparent resin compositions into the very small gaps between adjacent liquid crystal display panels among the above liquid crystal display panels; and the curing step of curing the transparent resin compositions after the above injection.

Furthermore, the present invention provides a liquid crystal display comprising a plurality of liquid crystal display panels arranged on the same plane while keeping predetermined gaps between them and a joint for joining adjacent liquid crystal display panels among the above liquid crystal display panels; in which the joint is provided with a matrix configured by a transparent material and an opaque area present in the matrix and formed of an aggregation of a plurality of very small opaque members.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

FIG. 1 is a perspective view of the liquid crystal display according to a first embodiment of the present invention.

FIG. 2 is a sectional view of the vicinity of a joint of a liquid crystal panel according to the first embodiment of the present invention.

FIGS. 3(A) to 3(C) are illustrations for explaining steps of obtaining a joint between liquid crystal panels according to the first embodiment of the present invention.

FIGS. 4(A) to 4(C) are illustrations for explaining other steps of obtaining a joint between liquid crystal panels according to the first embodiment of the present invention.

FIG. 5 is a sectional view of the vicinity of a joint of a liquid crystal panel according to a second embodiment of the present invention.

FIG. 6 is a sectional view of the vicinity of a joint of a liquid crystal panel according to a third embodiment of the present invention.

FIGS. 7(A) to 7(C) are illustrations for explaining steps of obtaining a joint between liquid crystal panels according to the third embodiment of the present invention.

FIG. 8 is a sectional view of the vicinity of a joint of a liquid crystal panel according to a fourth embodiment of the present invention.

FIGS. 9(A) and 9(B) are illustrations for explaining steps of obtaining a joint between liquid crystal panels according to the fourth embodiment of the present invention.

FIG. 10 is a sectional view of the vicinity of a joint between liquid crystal panels according to a fifth embodiment of the present invention.

FIG. 11 is a sectional view showing the vicinity of a joint between conventional liquid crystal panels.

FIGS. 12(A) to 12(C) are illustrations for explaining steps of obtaining a joint between the conventional liquid crystal panels.

DETAILED DESCRIPTION OF THE INVENTION

The present invention makes it possible to obtain a tile panel without having the difficulty of the technique disclosed in Published Unexamined Japanese Patent Application No. 8-122769 by using the technique of injecting the resin containing particles having opaqueness (hereafter referred to as opaque particles) into a joint between two adjacent liquid crystal display panels and curing the resin. Moreover, by adjusting the quantity and positions of opaque particles, it is possible to prevent the brightness of a liquid crystal display from deteriorating while preventing light leak at a joint.

In the case of the above display panel complex, a joint has opaqueness and a function for joining adjacent image display panels each other.

In the above display panel complex, the opaque particles can be dispersed in the thickness direction of the image display panels. In this case, the light incoming vertically to the image display panels has a long distance up to passing through a joint compared to the case of the diagonally incoming light. Therefore, the light incoming vertically to the image display panels may be easily interrupted by opaque particles but the diagonally incoming light passes through the joint without being interrupted by opaque particles. Thus, it is possible to prevent light leak at the joint and minimize reduction of brightness.

However, the present invention is not restricted to the above case. The present invention makes it possible to disperse opaque particles to the depth-directional central portion of the image display panels. Moreover, it is possible to provide anisotropy for the distribution density of the opaque particles in the thickness direction of the image display panels.

The liquid crystal display prevents leakage of light from the very small gaps and minimizes reduction of brightness similarly to the case of the above display panel complex of the present invention. Moreover, the filled part is constituted of an UV cure resin. For example, though it is possible to use a thermosetting resin, it may cause a liquid crystal display panel to be thermally deformed due to heating in thermosetting. However, an UV cure resin does not cause a liquid crystal display panel to be thermally deformed.

In the case of a liquid crystal display of the present invention, the filled part can be continuously formed in the thickness direction of the liquid crystal display panel. In this case, continuous formation represents that the filled part does not have a boundary. For example, when forming a filled part by injecting a certain quantity of UV cure resin compositions to cure them and thereafter moreover injecting UV cure resin compositions onto the cured compositions and curing them, a boundary which can be clearly confirmed is present between the previously injected and cured resin and the subsequently injected and cured resin. When the above boundary is present, continuous formation is not realized. In the case of the joint of the liquid crystal display disclosed in Published Unexamined Japanese Patent Application No. 8-122769 previously described, a boundary which can be clearly confirmed is present. Therefore, the joint does not correspond to the continuous formation described for the present invention. Therefore, when a boundary is present, separation from an interface may occur. Moreover, when a filled part has a function for bonding adjacent liquid crystal display panels each other, a filled part in which there is no boundary and which is continuously formed has a large joining strength compared to the case in which a boundary is present.

In the case of a liquid crystal display of the present invention, the black particles can be dispersed nearby the same plane as the plane on which the black matrix is formed. That is, black particles have the same function as a black matrix formed on a liquid crystal display panel. Therefore, the black particles are dispersed nearby the same plane as the plane on which a black matrix is formed. However, the present invention is not restricted to the above case. The present invention makes it possible to disperse black particles to either or both of the upper and lower portions of the filled part.

A joint in which only opaque particles are dispersed is translucent. Therefore, light may leak from the joint when the distribution density is not high enough. Therefore, the probability that light enters opaque particles is improved by dispersing transparent particles having a refractive index different from that of a resin constituting a joint into the joint and scattering the light entering the joint and thereby, leak of the light from the joint is reduced. Therefore, to sufficiently obtain the above effect, it is preferable that the opaque particles and the transparent particles are mixed in the holding portion.

It is preferable that the resin compositions are UV cure resin compositions. A liquid crystal display panel has a structure in which two glass substrates are superposed through a liquid crystal layer. When using thermosetting-resin compositions, a thermal strain may occur in a glass substrate due to the heat for curing. However, UV cure resin compositions do not cause a thermal strain in a glass substrate because heat is not used when the compositions are cured. Moreover, because UV cure resin compositions are used as an adhesive, it is possible to prevent leak of light between liquid crystal display panels and join liquid crystal display panels each other in one step. This shows the easiness of fabrication of a liquid crystal display panel complex of the present invention.

Moreover, because an interval between adjacent liquid crystal display panels in tile panels is equal to several ten microns, it is possible to easily inject resin compositions containing opaque particles into the interval by using a publicly-known dispenser. A method for injecting resin compositions into a gap between adjacent liquid crystal display panels is easier than the method for forming an opaque member at a portion having a width of 1.5 mm as disclosed in Published Unexamined Japanese Patent Application No. 8-122769.

According to the liquid crystal-display fabricating method, it is possible to obtain tile panels connected by a joint constituted of a transparent resin layer and a resin layer in which opaque particles are dispersed, and a transparent resin layer in order from the bottom.

A resin-composition curing step can be executed after a resin injecting step is completed. Moreover, it is possible to execute a resin-composition curing step whenever injecting resin compositions, for example, injecting transparent resin compositions and then curing them, injecting resin compositions containing opaque particles and then curing them, and injecting transparent resin compositions and then curing them. A resin-composition curing step of the present invention is defined as a step including both the steps. The same is true for other methods of the present invention.

By executing a resin-composition curing step after a resin injecting step is completed, formed joints are continuous. Moreover, by executing the resin-composition curing step whenever injecting resin compositions, a boundary is formed between formed joints.

Furthermore, by injecting the resin compositions containing the opaque particles at the thickness-directional central portion of the liquid crystal display panels, it is possible to obtain a tile panel in which opaque particles are dispersed at the thickness-directional central portion of the liquid crystal display panels.

The liquid crystal-display-panel joining method makes it possible to form a joint in which opaque particles are dispersed in a specific portion in a transparent resin. Therefore, when using the first resin-composition injecting step as a step of injecting the transparent resin compositions up to the vicinity of the thickness-directional middle portion of the liquid crystal display panels, it is possible to form a portion in which opaque particles are dispersed nearby the thickness-directional middle position of the liquid crystal display panels. That is, the present invention makes it possible to form a portion in which opaque particles are dispersed at other positions in the thickness direction of the liquid crystal display panels.

The above methods of the present invention makes it possible to execute the curing step after the opaque particles precipitate in the mixture. Thus, it is possible to form a joint, in the lower portion of which the opaque particles are dispersed unevenly.

Moreover, the method of the present invention makes it possible to execute a step of injecting transparent resin compositions up to the vicinity of the thickness-directional middle portion of the liquid crystal display panels and then curing the compositions before executing the step of injecting the mixture. The method makes it possible to form a joint in which opaque particles are dispersed nearby the thickness-directional middle portion of the liquid crystal display panels. In this case, one boundary is present in the thickness direction of the liquid crystal display panels. Therefore, the bonding strength is larger than the case of the liquid crystal-display-panel complex having two boundaries.

FIG. 1 is an illustration showing an exploded perspective view of a liquid crystal display of a first embodiment.

The liquid crystal display 10 comprises a backlight unit 20, a holding frame 30, and a liquid crystal panel 40.

The backlight unit 20 is provided with a lamp 21 serving as a light source, a holder 22 for holding the lamp 21, a reflector 23 for reflecting the light emitted from the lamp 21, and a light guide plate 24 using a line light source emitted from the lamp 21 as an area light source.

The holding frame 30 has a boxy frame body 31 having an opening 32 equivalent to a display area of the liquid crystal panel 40. Stoppers 33a, 33b, 33c, and 33d for holding the liquid crystal panel 40 are provided for four corners of the frame body 31. The holding frame 30 is obtained by integrally injection-molding a plastic such as polycarbonate or ABS resin.

The liquid crystal panel 40 is a tile panel in which a first liquid crystal panel 40a and a second liquid crystal panel 40b are adjacently arranged on the same plane.

The first liquid crystal panel 40a has a structure in which a second glass substrate 40a2 is superposed on a first glass substrate 40a1. Similarly, the second liquid crystal panel 40b has a structure in which a second glass substrate 40b2 is superposed on a first glass substrate 40b1.

A predetermined gap is formed between the first glass substrate 40a1 and the second glass substrate 40a2 and also a predetermined gap is formed between the first glass substrate 40b1 and the second glass substrate 40b2, and a liquid crystal material is injected into the gaps. In FIG. 1, a driving circuit section for driving the liquid crystal material is omitted. Moreover, for this embodiment, a case is described in which two pieces of the liquid crystal panel 40 such as the first liquid crystal panel 40a and the second liquid crystal panel 40b are compounded. However, the present invention is not restricted to the above case. It is possible to apply the present invention to compounding of three pieces of the liquid crystal panel 40 or more.

FIG. 2 is a schematic sectional view of the vicinity of a joint S between the first liquid crystal panel 40a and the second liquid crystal panel 40b.

A TFT (Thin Film Transistor) 42a serving as a liquid crystal driving device is formed on the first glass substrate 40a1 constituting the first liquid crystal panel 40a and a TFT 42b serving as a liquid crystal driving device is formed on the first glass substrate 40b1 constituting the second liquid crystal panel 40b. Moreover, a color filter 41a is formed on the second glass substrate 40a2 constituting the first liquid crystal panel 40a and a color filter 41b is formed on the second glass substrate 40b2 constituting the second liquid crystal panel 40b.

A black matrix (BM) superior in opaqueness is formed into a film and patterned on the color filters 41a and 41b at a thickness of approx. 0.1 $\mu$m. The BM is formed, as publicly known, for three purposes such as improvement of contrast, prevention of color materials from mixing, and prevention of outside light from being applied to the TFT 42a and TFT 42b.

Color films of R (red), G (green), and B (blue) are formed on openings on which a BM is not formed on the color filters 41a and 41b, that is, portions serving as pixels.

Though the liquid crystal panel 40 is made by connecting two pieces of the liquid crystal panel 40 such as the first liquid crystal panel 40a and second liquid crystal panel 40b each other, it is necessary to function like a single liquid crystal panel 40 when displaying an image. The first liquid crystal panel 40a and the second liquid crystal panel 40b are arranged so that the BM at the left end of the color filter 41a and the BM at the right end of the color filter 41b are facing each other. Moreover, the distance dB from the BM at the left end of the color filter 41a up to the BM at the right end of the color filter 41b is adjusted to the distance dB at the first liquid crystal panel 40a. By making the above arrangement, it is possible to make two pieces of the liquid crystal panel 40 display an image similarly to the case of a single liquid crystal panel. However, because the joint S is present between the first liquid crystal panel 40a and the second liquid crystal panel 40b, the light passing through the joint S is observed on the liquid crystal panels 40. Therefore, in the case of this embodiment, the joint S is constituted as described below.

In case of this embodiment, the joint S is formed of an UV cure resin and moreover, black particles BB are dispersed in the UV cure resin. Then, the black particles BB are dispersed nearby the central portion between the first liquid crystal panel 40a and second liquid crystal panel 40b in their thickness direction k.

This position can be the vicinity of a plane same as the plane on which a BM is formed. Therefore, the black particles BB that are an aggregation of black particles BB have the same function as the BM on the color filter 41a and the color filter 41b. Thus, the light α incoming from a direction vertical to the joint S and emitted from the backlight unit 20 is absorbed by many black particles BB and prevented from reaching the upper face of the liquid crystal panel 40 in FIG. 2. That is, an opaque area formed by an aggregation of a plurality of very small opaque members is formed in a matrix made of a transparent material. Moreover, the light β diagonally entering the first glass substrate 40a1 of the first liquid crystal panel 40a and emitted from the backlight unit 20 passes through the UV cure resin of the joint S and moreover, passes through the adjacent second glass substrates 40b1 and 40b2 of the second liquid crystal panel 40b. That is, there is no loss on the diagonally incoming light β and it is possible to obtain the same brightness as the case of a single display panel.

A method for forming the joint S of this embodiment will be described below by referring to FIGS. 3(A) to 3(C).

First, the first liquid crystal panel 40a and the second liquid crystal panel 40b are arranged on the same plane while keeping a predetermined gap between them. The gap forms the joint S. The gap typically ranges between 10 and 50 μm.

First, as shown in FIG. 3(A), UV cure resin compositions (shown as UV in FIG. 3(A) and hereafter also shown as UV) are injected into the gap by using a publicly-known dispenser. The quantity of UV to be injected is up to approx. ⅓ the thickness of the first liquid crystal panel 40a and second liquid crystal panel 40b. After injecting the UV, the UV is cured through irradiation with ultraviolet radiation. The obtained UV has transparency. When the UV is not completely cured only by applying ultraviolet radiation, it is possible to accelerate curing by heating. However, a problem such as expansion of a glass substrate does not easily occur because of low-temperature heating compared to the case of a thermosetting resin.

In this case, it is also possible to use any resin such as acrylic- or epoxy-based resin having been publicly-known so far. However, it is preferable to use a resin having a refractive index equal to that of a glass substrate constituting the first liquid crystal panel 40a or second liquid crystal panel 40b. It is permitted to consider the refractive index of the glass substrate because it is equal to approx. 1.5.

Then, as shown in FIG. 3(B), UV cure resin compositions containing black particles BB are injected. When the injection is completed, the UV cure resin compositions are cured through irradiation with ultraviolet radiation. After the compositions are cured, an UV cure resin in which the black particles BB are dispersed is formed.

In this case, black spacers can be used as the black particles BB. That is, to control the gap between the first glass substrate 40b1 and second glass substrate 40b2, spherical members referred to as spacers are arranged on the liquid crystal panels 40. This embodiment uses the spacers as the black particles BB.

The spacer can be classified into resin type and silica type in accordance with the type of the material. Either type can be used for this embodiment. To use either type for this embodiment, the surface of the spacer must be blackened. Even at present, a spacer is blackened in order to prevent contrast from lowering. Therefore, it is possible to appropriate the spacer. Moreover, it is permitted to use a not-blackened spacer by coloring the surface of the spacer to black with pigment or dye. Furthermore, it is possible to adjust the specific gravity of the black particle BB through the above coloring.

This embodiment uses black particles BB as opaque particles. As long as a particle has opaqueness, the particle squares with an object of the present invention. For example, because a BB is generally made from of a thin film made of metallic chromium, metallic powder can be used for the BB when metallic powder having a particle diameter almost equal to that of a spacer, that is, a particle diameter of several-micron level can be manufactured. Moreover, any other material can be used for the present invention as long as the material has opaqueness and a particle diameter of several-micron level.

Finally, as shown in FIG. 3(C), the UV cure resin compositions are injected up to the top of the gap to cure the compositions by irradiating them with ultraviolet radiation after the compositions are injected.

According to the above steps, black particles BB are dispersed nearby the depth-directional central portion of the liquid crystal panel 40 and it is possible to form the joint S serving as a filled part filled with a transparent UV cure resin on other portions. Because the joint S is constituted of an UV cure resin used as an adhesive, it also has a function for joining the first liquid crystal panel 40a with the second liquid crystal panel 40b.

In the case of the above embodiment, black particles BB are contained in UV cure resin compositions and injected. However, the present invention is not restricted to the above method. For example, it is also possible to use the method shown in FIGS. 4(A) to 4(C). That is, as shown in FIG. 4A, UV cure resin compositions are injected into the gap between the first liquid crystal panel 40a and second liquid crystal panel 40b and thereafter cured through irradiation with ultraviolet radiation after the injection of the compositions is completed. This step is the same as the case of the embodiment shown in FIGS. 3(A) to 3(C). Then, as shown in FIG. 4(B), black particles BB are directly scattered, that is, without being contained in UV cure resin compositions. As shown in FIG. 4(C) UV cure resin compositions are injected, after injection of the compositions is completed, ultraviolet radiation is applied to the compositions. Also by this method, it is possible to form the joint S having the structure shown in FIG. 2.

Moreover, in the case of the above embodiment, curing by irradiation with ultraviolet radiation is performed whenever injection of UV cure resin compositions is completed. However, the present invention is not restricted to the above method. Therefore, it is also permitted to inject all UV cure-resin compositions and thereafter cure the compositions at the same time by irradiating them with ultraviolet radiation. Because it is estimated that the degree of curing by irradiation with ultraviolet radiation is lowered as the thickness of UV cure resin compositions increases, it is preferable to perform curing whenever injection of UV cure resin compositions is completed.

A second embodiment of the present invention will be described below by referring to FIG. 5.

The second embodiment is different from the first embodiment in that black particles BB are present only nearby the depth-directional central portion of the liquid crystal panel 40 in case of the first embodiment but black particles BB are present along the entire depth direction of a liquid crystal panel 40 of a joint S in case of the second embodiment as shown in FIG. 5.

Also in the case of the second embodiment, light α incoming from a direction vertical to the joint S and emitted from a backlight unit 20 is absorbed by a group of black particles BB and prevented from reaching the upper face of the liquid crystal panel 40 in FIG. 5. Light β diagonally entering a first glass substrate 40a1 of a first liquid crystal panel 40a and emitted from the backlight unit 20 is absorbed by black particles BB dispersed in the joint S. However, a distance when assuming that diagonally incoming light passes through the joint S is shorter than the vertical distance of the joint S. Therefore, a probability of the diagonally incoming light to be absorbed by black particles BB is considerably lower than a probability of the light vertically entering the joint S to be absorbed by black particles BB. That is, because some of the diagonally-incoming light β may pass through the joint S, it is possible to control loss of light. Therefore, the second embodiment makes it possible to reduce light loss while preventing leak of light from the joint S by properly setting the distribution density of black particles BB.

To obtain the joint S of the second embodiment, the first liquid crystal panel 40a and second liquid crystal panel 40b are first arranged on the same plate while keeping a predetermined gap between them similarly to the case of the first embodiment. Then, UV cure resin compositions containing black particles BB are injected into the gap and filled. When injection of the compositions is completed, the compositions are cured through irradiation with ultraviolet radiation.

The second embodiment has an advantage that the number of steps is decreased compared to the case of the first embodiment because injection of UV cure resin compositions containing black particles BB can be completed in one step. Moreover, because the joint S becomes continuous with no boundary, the second embodiment is advantageous in joining strength compared to the first embodiment in which a boundary is present.

A third embodiment of the present invention will be described below by referring to FIGS. 6 and 7A to 7C. The third embodiment is different from the first embodiment in that black particles BB are present only nearby the thickness-directional central portion of the liquid crystal panel 40 in the case of the first embodiment but black particles BB are present at upper and lower portions of a liquid crystal panel 40 of a joint S in the case of the third embodiment as shown in FIG. 6. Moreover, the joint S in which black particles BB are not present is constituted of a transparent UV cure resin.

Also in the case of the third embodiment, light α vertically incoming into the joint S and emitted from a backlight unit 20 is absorbed by black particles BB dispersed in the lower portion of the liquid crystal panel 40. Even if some light passes through the lower portion, it is possible to absorb the light by black particles BB dispersed in the upper portion of the liquid crystal panel 40. Moreover, light β diagonally entering the first glass substrate 40a1 of a first liquid crystal panel 40a and emitted from the backlight unit 20 can pass through a transparent UV cure resin, it is possible to reduce light loss. Moreover, in the case of the third embodiment, black particles BB are dispersed in the upper and lower portions of the liquid crystal panel 40. However, it is possible to disperse the particles BB in either of the upper and lower portions of the panel 40. In this case, the distribution density of black particles BB is raised in order to prevent light from leaking from the joint S.

A method for forming the joint S of the third embodiment will be described below by referring to FIGS. 7(A) to 7(C).

First, the first liquid crystal panel 40a and the second liquid crystal panel 40b are arranged on the same plane while keeping a predetermined gap between them. Then, as shown in FIG. 7(A), UV cure resin compositions containing black particles BB are injected into the gap. After the compositions are injected, they are cured through irradiation with ultraviolet radiation. After the compositions are cured, an UV cure resin in which black particles BB are dispersed is formed.

Then, as shown in FIG. 7(B), UV cure resin compositions not containing black particles BB are injected up to the vicinity of the upper face of the liquid crystal panel 40. After the compositions are injected, they are cured through irradiation with ultraviolet radiation. After the compositions are cured, a transparent UV cure resin is formed.

Finally, as shown in FIG. 7(C), UV cure resin compositions containing black particles BB are injected. After the compositions are injected, they are cured through irradiation with ultraviolet radiation. After the compositions are cured, an UV cure resin in which black particles BB are dispersed is formed.

A fourth embodiment of the present invention will be described below by referring to FIGS. 8 and 9.

The fourth embodiment is different from the first embodiment in that black particles BB are present only nearby the thickness-directional central portion of the liquid crystal panel 40 in case of the first embodiment but black particles BB are present at a lower portion of a liquid crystal panel 40 of a joint S as shown in FIG. 8 in case of the fourth embodiment. Moreover, a distribution of black particles BB shows a hanging-bell shape having anisotropy. The joint S including no black particles BB is constituted of a transparent UV cure resin.

Also in case of the fourth embodiment, light α vertically entering the joint S and emitted from a backlight unit 20 is absorbed by black particles BB dispersed in a lower portion of a liquid crystal panel 40. However, because light β diagonally entering a first glass substrate 40a1 of a first liquid crystal panel 40a and emitted from the backlight unit 20 can pass through a transparent UV cure resin, it is possible to reduce light loss.

A method for forming the joint S of the fourth embodiment will be described below by referring to FIGS. 9(A) and 9(B).

The fourth embodiment is characterized by using black particles BB having a specific gravity larger than that of UV cure resin compositions.

First, the first liquid crystal panel 40a and a second liquid crystal panel 40b are arranged on the same plane while keeping a predetermined gap between them. Then, as shown in FIG. 9(A), UV cure resin compositions containing black particles BB are injected into the gap and filled. Immediately after the compositions are injected into the gap, black particles BB are uniformly dispersed in the compositions as shown in FIG. 9(A). However, after the particles BB are left as they are for a predetermined time, they precipitate in the UV cure resin compositions because the specific gravity of the particles BB is larger than that of the compositions. In this case, because black particles BB do not have a completely uniform particle diameter, they differ in precipitation rates. Therefore, a state of precipitation after a predetermined time elapses, that is, a distribution of black particles BB shows a hanging-bell shape as shown in FIG. 9(B).

UV cure resin compositions are cured through irradiation with ultraviolet radiation after a predetermined time elapses. After the compositions are cured, an UV cure resin in which black particles BB are dispersed is formed. A distribution of the black particles BB after the compositions are cured shows a hanging-bell shape having anisotropy at upper and lower portions as shown in FIG. 9(B).

In case of the fourth embodiment, because UV cure resin compositions are simultaneously injected, a cured UV cure resin is continuously formed. Therefore, the layer is superior in joining strength. However, the present invention is not restricted to the above case of injecting UV cure resin compositions at a time in a mode for using black particles BB having a specific gravity larger than that of the compositions. By injecting UV cure resin compositions a plurality of times separately, it is also possible to disperse black particles BB into a plurality of thickness-directional areas of the liquid crystal panel 40.

Moreover, from the viewpoint of using a difference between specific gravities, it is also possible to use black particles BB having a specific gravity smaller than that of UV cure resin compositions. In this case, it is possible to form an opaque area on the upper portion of the liquid crystal panel 40.

A fifth embodiment of the present invention will be described below by referring to FIG. 10.

The fifth embodiment is different from the first embodiment in that black particles BB are present only nearby the thickness-directional central portion of the liquid crystal panel 40 in case of the first embodiment but black particles BB are present along the entire thickness direction of a liquid crystal panel 40 of a joint S in the case of the fifth embodiment as shown in FIG. 10. Moreover, the fifth embodiment is different from the first embodiment in that not only black particles BB but also transparent particles CB are dispersed along the entire thickness direction of the liquid crystal panel 40 as shown in FIG. 10. However, the transparent particles CB have a refractive index different from that of an UV cure resin holding the particles CB.

According to the fifth embodiment, because the black particles BB dispersed in a joint S have opaqueness, some of the light α vertically entering the joint S and emitted from a backlight unit 20 can be absorbed by black particles BB. Moreover, because the transparent particles CB have a refractive index different from that of an UV cure resin, the light passing through the UV cure resin and entering the particles CB is scattered and thereby, it is prevented from reaching the upper face of the liquid crystal panel 40. Moreover, some of the scattered light is absorbed by black particles BB. That is, leak of light from the joint S is controlled through absorption of light by black particles BB and scattering of light by transparent particles CB.

To obtain the joint S of the fifth embodiment, a first liquid crystal panel 40a and a second liquid crystal panel 40b are first arranged on the same plane while keeping a predetermined gap between them similarly to the case of the first embodiment. Thereafter, UV cure resin compositions containing black particles BB and transparent particles CB are injected into the gap and filled. When injection of the compositions is completed, curing through irradiation with ultraviolet radiation is executed.

The fifth embodiment has an advantage that the number of steps is decreased as compared with the case of the first embodiment because injection of UV-curing-resin composition is performed in one step. Moreover, because the joint S becomes continuous with no boundary, the fifth embodiment is advantageous in joining strength compared to the first embodiment having a joint in which a boundary portion is present.

As described above, the present invention makes it possible to prevent light from leaking from a joint between tile panels. Moreover, the present invention makes it possible to prevent light leak by minimizing light loss. Furthermore, the present invention makes it possible to efficiently fabricate tile panels because of using a secure fabricating method of injecting opaque particles between liquid crystal panels to be connected each other while dispersing the particles in a resin or the like. Furthermore, because the present invention makes it possible to provide opaque particles for an optional portion of a joint, it is possible to flexibly correspond to a characteristic requested for a liquid crystal display.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A display panel complex, comprising:
   a plurality of image display panels arranged on the same plane; and
   a joint for joining adjacent image display panels to each other among said plurality of image display panels, said joint is made of opaque particles and an adhesive resin for dispersing and holding the opaque particles wherein the distribution density of the opaque particles is asymmetric in the thickness direction of the image display panel.

2. The display panel complex according to claim 1, wherein the opaque particles are dispersed in the thickness direction of the image display panel.

3. The display panel complex according to claim 1, wherein the distribution density of the opaque particles at the joint has anisotropy in the thickness direction of the image display panel.

4. A liquid crystal display, comprising:
   a plurality of liquid crystal display panels arranged on the same plane while keeping predetermined gaps between the display panels; and
   a joint for joining adjacent liquid crystal display panels each other among the plurality of the liquid crystal display panels,
   wherein the joint is provided with
   a transparent resin layer;
   opaque particles dispersed in the resin layer and having opaqueness; and
   transparent particles constituted of resin dispersed in the resin layer, passing light, and having a refractive index different from that of the resin layer.

5. The liquid crystal display according claim 4, wherein the opaque particles and the transparent particles are mixed in the joint.

6. A liquid crystal-display-panel joining method, comprising the steps of:
   arranging in an adjacent manner a plurality of liquid crystal display panels like tiles while keeping predetermined intervals between the display panels;
   injecting resin compositions containing opaque particles between the adjacent liquid crystal display panels; and
   curing the resin compositions containing the injected opaque particles.

7. The liquid crystal-display-panel joining method according to claim 6, further comprises the step of comprising the resin compositions from UV cure compositions.

8. A liquid crystal-display fabricating method for making a display screen by arranging a plurality of liquid crystal display panels on the same plane while keeping very small gaps between the display panels, comprising:

a step of arranging the liquid crystal display panels while keeping predetermined gaps between the display panels;

a step of injecting transparent resin compositions into the gaps between adjacent liquid crystal display panels and then, injecting resin compositions containing opaque particles into the gaps and moreover injecting transparent resin compositions into the gaps; and a resin-composition curing step of curing the resin compositions injected into the gaps between the adjacent liquid crystal display panels.

9. The liquid crystal-display fabricating method according to claim 8, wherein the step of injecting the resin compositions containing opaque particles is performed at the central portion of the liquid crystal display panel in its depth direction.

10. A liquid crystal-display fabricating method for fabricating a liquid crystal display screen by arranging a plurality of liquid crystal display panels on the same plane while keeping very small gaps between the display panels, comprising:

a step of arranging the liquid crystal display panels while keeping predetermined gaps between the display panels;

a first resin-composition injecting step of injecting transparent resin compositions into the gaps between the adjacent liquid crystal display panels;

a step of scattering opaque particles onto the injected transparent resin compositions in the gaps between the adjacent liquid crystal display panels;

a second resin-composition injecting step of injecting transparent resin compositions into the gaps between the adjacent liquid crystal display panels after scattering the opaque particles; and a resin-composition curing step of curing the resin compositions injected into the gaps between the adjacent liquid crystal display panels.

11. A liquid crystal-display fabricating method, comprising:

a step of arranging a plurality of liquid crystal display panels while keeping predetermined gaps between them;

a step of injecting a mixture of transparent resin compositions and opaque particles having a specific gravity larger than that of the transparent resin compositions into the gaps between the adjacent liquid crystal display panels; and a curing step of curing the transparent resin compositions in the mixture.

12. The liquid crystal-display fabricating method according to claim 11, wherein the curing step is executed after a predetermined quantity of the opaque particles precipitate in the mixture.

13. A liquid crystal-display fabricating method for constituting a display screen by arranging a plurality of liquid crystal display panels on the same plane while keeping very small gaps between the display panels comprising:

a step of filling the very small gaps between adjacent liquid crystal display panels among the liquid crystal display panels with opaque particles, transparent particles passing light, and transparent resin compositions; and a curing step of curing the transparent resin compositions after the gaps are filled.

* * * * *